United States Patent [19]

Gabbay

[11] 4,298,349

[45] Nov. 3, 1981

[54] USE OF ALDEHYDES AS EMBRITTLING AGENTS FOR WASTE

[75] Inventor: Shlomo M. Gabbay, Irvine, Calif.

[73] Assignee: Occidental Research Corporation, Irvine, Calif.

[21] Appl. No.: 71,438

[22] Filed: Aug. 31, 1979

[51] Int. Cl.$^3$ .............................................. C10L 9/02
[52] U.S. Cl. ...................................... 44/1 C; 44/1 D
[58] Field of Search ................. 44/1 R, 1 D, 1 F, 1 C

[56] References Cited

PUBLICATIONS

Investigation of Adv. Thermal-Chem. Concepts of Obtaining Improved MSW-Derived Products, Hecht et al, EPA-600/7-78-143, Aug., 1978.

Primary Examiner—Carl F. Dees

[57] ABSTRACT

The instant invention relates to a method of converting the solid organic fraction of solid waste into a powdered fuel which comprises heating said solid organic fraction in the presence of an aldehyde having more than one carbon atom, preferably a multifunctional aldehyde such as glyoxal, for a time and at a temperature sufficient to embrittle said solid organic fraction, comminuting said embrittled solid organic fraction to a powder which is less than a predetermined particle size, and recovering said powder.

The solid organic fraction may be separated from the solid waste prior to treatment by the process of this invention or alternatively the solid waste can be treated by the method of this invention and the embrittled organic fraction separated therefrom. The aldehyde may be added to the solid organic fraction as an aqueous solution, a gas, or solid. The embrittling process takes place at a temperature of at least 125° C., preferably from 150° C. to 250° C. and said embrittled solid organic fraction is preferably comminuted to a predetermined particle size of less than 10 mesh.

25 Claims, 1 Drawing Figure

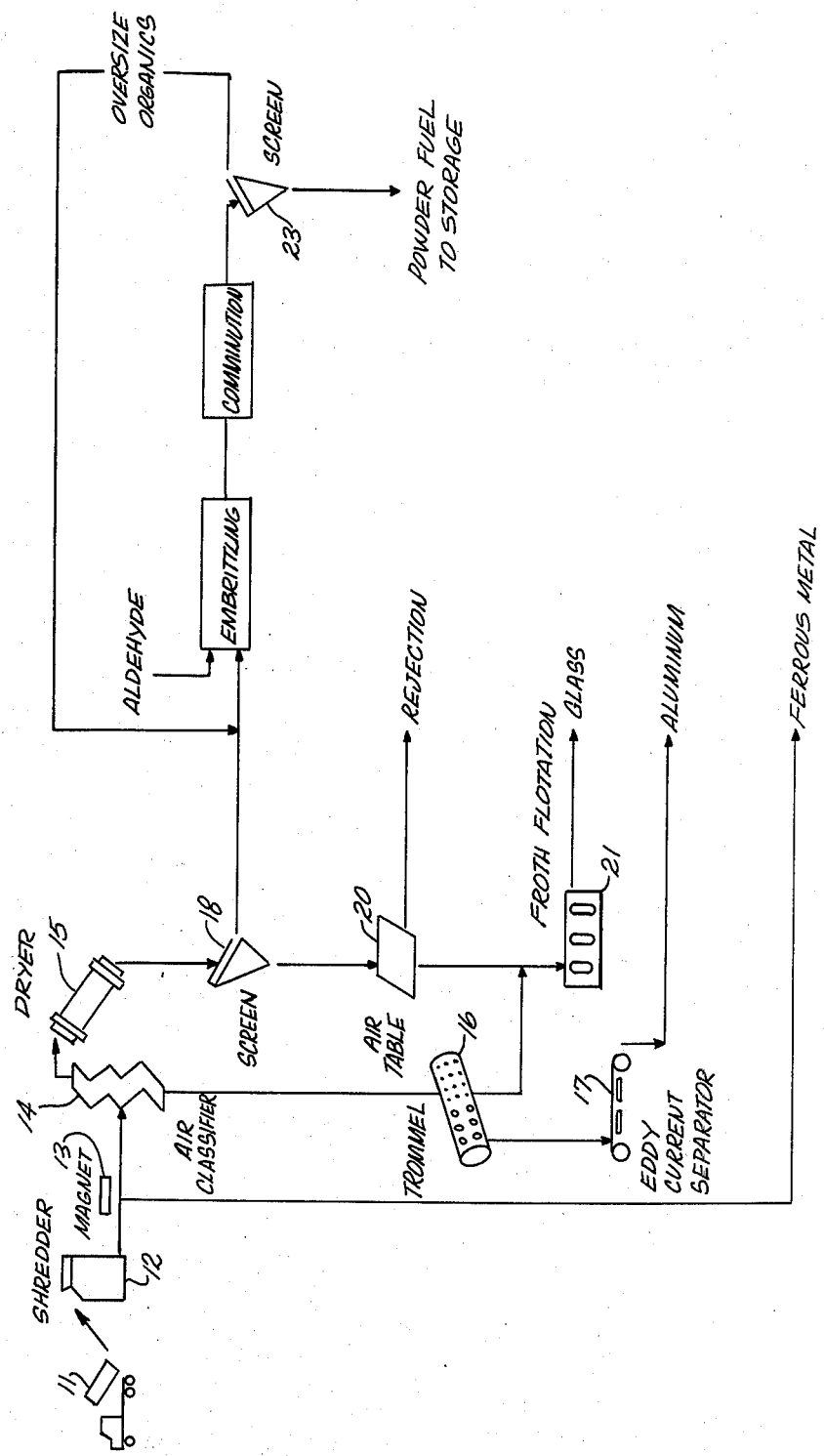

USE OF ALDEHYDES AS EMBRITTLING AGENTS FOR WASTE

BACKGROUND OF THE INVENTION

1. Field of the Invention

The instant invention relates to making a useable powdered fuel from municipal or other solid waste sources by embrittling the solid organic fraction of said waste at elevated temperatures and in the presence of an aldehyde having more than one carbon atom, preferably an aldehyde having from two to five carbon atoms, and most preferably a difunctional aldehyde e.g. glyoxal. After embrittlement, the embrittled solid organic fraction is comminuted, e.g. by grinding, to less than a predetermined particle size and a powdered fuel having a high caloric value is recovered. The powdered fuel may be used as is or can be cofired with other fuels such as heating oils or coals.

2. Description of the Prior Art

Many processes for the reclamation of various valuable materials from waste sources are known. For example, municipal solid waste may be a source of aluminum ferrous metals, glass, plastics, paper and textiles.

In an exemplary process for the separation of valuable materials from solid waste sources, the incoming waste is shredded to reduce the waste to easily handled particle size, e.g. less than 4 inches. The shredded waste may be passed through a magnetic field to remove ferrous metals and subjected to air-classification or other procedures known in the art to separate the lighter materials, such as the various organics present in the waste, from the heavier materials such as glass, rock, dirt, etc. The heavier materials may be further treated to remove the electroconductive, non-magnetic metals, e.g. aluminum fragments, by processes that rely on the electroconductive nature of aluminum to separate it from admixture with other materials. The glass may be recovered by procedures known in the art such as froth flotation. Finally, the lighter organic materials, e.g. the overhead from the air-classification may be burned to provide heat or pyrolyzed to provide gaseous or liquid products. In general, the objective of municiple waste treatment processes is to recover all valuable materials and minimize the amount of said waste that must be disposed of as landfill.

In a process described in U.S. Pat. Nos. 3,961,913 and 4,008,053, the solid organic fraction of municipal waste or other waste is converted into a powdered fuel. In the process described in these patents a mineral acid is used to embrittle the organic fraction and said embrittled organic fraction is then ground to a powdered fuel. The difficulty inherent in this process is that the mineral acids such as hydrochloric acid or sulphuric acid, while efficient for embrittling the solid organic fraction, leave various undesirable moieties in the powdered fuel. For example, fuel derived from the solid organic fraction of municipal solid waste is, in and of itself, very low in sulphur. When sulphuric acid, however, is utilized as the embrittling agent in the above process, significant amounts of sulphur remains in the powdered fuel that is recovered. It is known in the art that the burning of sulphur containing fuels is undesirable from an environmental standpoint.

The use of hydrochloric acid as the embrittling agent results in a significant amount of chlorine in the powdered fuel recovered from the process. Hydrochloric acid causes corrosion problems, during the embrittlement process as well as during the burning of the powdered fuel derived from the hydrochloric acid embrittlement process. In order to use the above powdered fuels, additional treatment of fuel to remove sulphur or chlorine is required prior to or during the combustion process to prevent these undesirables from entering the environment. These additional requirements, of course, decrease the value of the solid fuel made by the process described in the above patents.

Another reference which suggests the use of chemical embrittling agents to facilitate the conversion of the solid organic fraction of municipal solid waste into a powdered fuel is EPA-600/7-78-143, August, 1978 authored by N. L. Hecht, et al., and entitled "Investigation of Advanced Thermal-Chemical Concepts for Obtaining Improved MSW-Derived Products." The authors in this report tested formaldehyde, hydrochloric acid, chlorine, sulphur dioxide, etc. as chemical brittling agents. In addition, experiments involving the use of formic acid with formaldehyde were run but the authors concluded that these combinations failed to produce "significant embrittlement." This reference did not discuss the use of any other aldehydes as embrittling agents, therefore, the unexpected advantages of using the aldehydes having more than one carbon atom, as aldehydes disclosed herein were not.

Finally, the authors did not disclose the particle size of the powdered fuel which they obtained in any of their experiments.

The above problems associated with the prior art processes for preparing powdered fuel from municipal and other waste sources are overcome by the method of the instant invention.

BRIEF SUMMARY OF THE INVENTION

The instant invention relates to a method of converting the solid organic fraction of waste into a powdered fuel which comprises heating said solid organic fraction in the presence of an aldehyde having more than one carbon atom for a time and at a temperature sufficient to embrittle said solid organic fraction, comminuting said embrittled solid organic fraction to a powder which is less than a predetermined particle size and recovering said powder for use as a fuel. The solid organic fraction is thereby converted to a densified, easily storable fuel product by the method of the instant invention.

The method of the instant invention is suitable for converting any waste from whatever source, provided such waste has a significant cellulosic fraction. Thus, municipal solid wastes, industrial wastes, agricultural wastes, etc., can be treated by the method of the instant invention provided an economically significant fraction of such waste is cellulosic in nature. Other organic fractions may be present in the waste, such as plastic, rubber, fat, oil, manure, etc., and will contribute to the heating value of the powder fuel recovered from the waste. However, it is believed that the cellulosic fraction is most significantly affected by the method of this invention.

BRIEF DESCRIPTION OF THE FIGURE

The FIGURE describes a flow scheme for the preferred embodiment of the method of the instant invention.

DETAILED DESCRIPTION

The instant invention relates to a method of converting the solid organic fraction of solid waste, e.g. municipal solid waste, into a powdered fuel by heating such solid organic fraction in the presence of an aldehyde having more than one carbon atom, e.g. an aldehyde having from two to five carbon atoms preferably a difunctional aldehyde, e.g. glyoxal, for a time and at a temperature sufficient to embrittle said solid organic fraction, comminuting said embrittled solid organic fraction to a powder, e.g. by grinding and recovering said powder.

The solid organic fraction may be treated by the method of this invention either after or prior to separation from the remaining waste. For example, after shredding, the organic fraction of the waste might be removed from other components by processes known in the art such as air classification, etc. The solid organic fraction may then be embrittled by the method of this invention and ground into a powder.

The dosage of the above aldehyde acid may range from about 0.1% to 10% by weight, preferably from 0.1% to 2%. Dosage shall be defined for the purposes of this specification as weight parts aldehyde per 100 weight parts of the dried solid organic fraction, expressed as a percentage. The aldehyde may be added as a powder, liquid or gas depending on its nature. However, to ensure proper distribution in the solid waste, the organic acid is generally added as a solution, preferably an aqueous solution, e.g. the preferred glyoxal may conveniently be added as a weight % solution in water.

The aldehyde may be a single aldehyde or a combination of any two or more described above. In general, the total amount of such aldehyde (including aldehydes present in the solid waste or generated during the embrittling process) will be within the above dosage ranges.

While the temperature of embrittlement will vary with the dosage of aldehyde and the nature of the solid waste being embrittled, a temperature of at least 125° C. is required. Preferably the temperature will be from about 150° C. to about 175° C. Optimum temperatures for the embrittlement process at any given aldehyde dosage can be determined in a limited number of experiments by those skilled in the art.

The time required for such embrittlement will also be relative to the aldehyde dosage as well as the nature of the solid waste. Alternatively, the shredded waste can be treated by the method of this invention whereby the organic fraction is embrittled and the shredded inorganics in the waste can function as a comminuting aid prior to their separation from the organic fraction.

The aldehydes having more than one carbon atom which are suitable for use as embrittling agents in the instant invention are preferably $C_2$ to $C_5$ aldehydes, more preferably $C_2$ to $C_3$ aldehydes. The most preferred aldehydes are multifunctional, e.g. difunctional, such as glyoxal. Examples of other suitable, but less preferred aldehydes include propionaldehyde, acetaldehyde, and butyraldehyde. Preferred of the above examplary aldehydes are selected from the group consisting of propionaldehyde, acetaldehyde and glyoxal with glyoxal the most preferred of the above.

It is believed that multifunctional aldehydes, e.g. difunctional aldehydes such as glyoxal, can act as tetrafunctional crosslinking agents for the cellulose present in municipal solid waste and are for this reason more effective than monofunctional aldehydes such as formaldehyde which act as difunctional crosslinking agents. In addition, the time will be related to the temperature of embrittlement as will be appreciated by those skilled in the art. Preferably, because of economics, the time for embrittlement will be less than one (1) hours, e.g. from about 20 to 40 minutes.

The embrittlement process of the instant invention may be carried out under any atmosphere. The oxygen partial pressure, however, should be insufficient to cause an explosion or to allow significant combustion of the organic fraction of solid waste. Preferably less than 10% oxygen will be present during the embrittlement reaction. Suitable atmospheres include $CO_2$, $N_2$, $CO$, $H_2$, $H_2O$, etc. For the sake of economy and safety, the embrittlement process may be carried out under an atmosphere generated by a state of the art inert gas generator.

The embrittlement process of the instant invention may be carried out in any of the known devices used in municipal solid waste treating. For example, since the embrittled solid waste should be comminuted to less than a predetermined particle size, the embrittlement step can be carried out simultaneously with comminution in any suitable device, or alternatively, the solid waste could be embrittled prior to comminution. It will be appreciated that the embrittlement process will be carried out to the extent suitable for comminuting the embrittled solid organic fraction with a minimum expenditure of energy. It is desirable to recover a solid fuel powder having a particle size of less than 10 mesh; more preferably less than 20 mesh (Standard Tyler Screen Scale). Therefore, the comminution will be carried out until at least a substantial portion of the embrittled solid organic fraction is less than said predetermined particle size. The partially comminuted powder can be treated to remove particles having greater particle size and the over-sized particles returned to the embrittlement step. Alternatively, comminution can be continued until substantially all of the embrittled solid waste is below the predetermined limit.

The recovered powdered fuel can be burned in its powder form or it may be pelletized either by compression (with or without the use of binders such as starch, etc.) Alternatively, the powder can be slurried with an oil and such slurry utilized as a fuel. In any event, by means of the method of the instant invention, the solid organic fraction of the waste will be densified, and therefore, of a much decreased volume. Of course, a densified material is more easily handled. Furthermore, in the densified state the solid organic waste is more economical to store. The objective of this invention is to provide this densified, easily stored material without significant loss of the heating value of the solid organic fraction. In the instant process, the embrittlement conditions are maintained so that no pyrolysis or substantial decomposition occurs, i.e. dry weight loss is held to a minimum, so that preferably less than 10% of the heating value of the solid organic is lost the conversion to powdered fuel.

DESCRIPTION OF THE PREFERRED EMBODIMENT

The FIGURE shows a complete scheme to process municipal solid waste (MSW) into valuable materials, which scheme includes the conversion of the solid organic fraction of MSW into a powdered fuel by the instant novel embrittling method. There is provided a waste collection storage and transfer area where dump trucks (11) or similar refuse transport units are continuously employed to deposit municipal solid waste for processing and recovery of the valuable materials contained therein.

After the removal of the oversized bulky waste, e.g. refrigerators, etc., the MSW may be dumped directly onto a conveyor (not shown) for transfer to the primary shredder 12. The primary shredder may be a ring grinder, attrition mill, impact mill, hammer mill or the like. A hammer mill is preferred for shredding efficiency and relatively low maintenance requirements.

The shredder comminutes the waste independent of its makeup to a size suitable for classification into a predominantly organic and inorganic fraction. Approximately 80% or more of the feed to the primary shredder is comminuted to a size of about 4 inches or less.

The comminuted MSW is conveyed to a magnetic separator 13 wherein a ferrous metal fraction comprising substantially all of the ferrous metals such as shredded tin cans, is removed from the comminuted MSW by magnetic separation. The ferrous metal-free, comminuted MSW remaining after magnetic separation is tansferred to an air-classifier 14 by suitable conveying means. In the air-classifier, the separation of the ferrous metal-free, comminuted MSW into a light organic fraction and a heavy inorganic fraction is obtained. As shown, the air-classifier provides a zig-zag path for particles and air flow. The purpose is to impart a stop-start tumbling process to particles with many different exposures to upwardly flowing air and the downward force of gravity. The end result is the elutriation of the light organic fraction from the ferrous metal-free comminuted MSW fed to the air-classifier. The elutriated organic fraction is transported to the dryer 15 by conveyor means. The heavy inorganic fraction from the air-classifier may be subjected to further comminution (comminution means not shown in FIGURE) prior to sending such heavy inorganic fraction to a trommel screen 16, wherein the smaller particle fraction of such heavy inorganic fraction is removed therefrom. Other methods for separating the ferrous metal-free, comminuted MSW into an organic fraction and an inorganic fraction are known in the art and may be substituted for the air-classification disclosed herein. Alternatively, the organic fraction may be separated from the comminuted MSW prior to the removal of the ferrous metal fraction although this method is less preferred.

At the trommel screen the heavy inorganic fraction is separated into essentially two separate fractions. The large particle fraction, for example, in the range of from about 0.5 inches to about 3 or 4 inches contains a proportionally high percentage of aluminum and is, therefore, transferred to eddy-current separator 17 which separates non-ferrous metals, namely aluminum, for sale. A suitable eddy-current separator is described in U.S. Pat. No. 3,960,661 hereby incorporated by reference for that purpose. The small particle fraction, from the trommel screen, that is, the fraction that is 0.5 inches and less, is rich in glass and, therefore, may be conveyed to the glass recovery operation described further below. Other methods for classifying the heavy inorganic fraction into the above described small and large particles fractions may be substituted for the preferred trommel screen.

The elutriated organic fraction from the air-classifier is sent to dryer 15, wherein it is treated at a sufficient temperature in the presence of a dry gas, to reduce the moisture content of such fraction. The elutriated organic fraction preferably comprises at least 85% by weight organic materials on a dry basis and the remainder is finely divided inorganics such as glass. Drying may be carried out by either direct or indirect heating in equipment known in the art. For example, flue gas can be passed through the organic fraction in a drum dryer. Upon exiting the dryer, preferably the moisture content of such organic fraction will be less than about 10% by weight. The dry organic fraction exiting dryer 15 is conveyed to a screen 18 to separate larger organic particles from any residual recoverable inorganic constituent such as glass, which may have eluded classification in the air classifier 14. Since the density of inorganic particles typically is greater than the density of the organic particles, any inorganic particles carried overhead in the air classifier tend to be smaller than the organic particles carried overhead. Therefore, predominantly inorganic particles fall through screen 18. The oversized materials from screen 18, i.e. the organic particles, are sent to the embrittling reactor 19 further described below.

The finely divided inorganic particles falling through screen 18 are conveyed to an air table 20, wherein glass is separated from other inorganics to facilitate the recovery of the glass in the froth flotation unit described below. A typical air table, also referred to as a gravity separator, comprises a perforated platform with a series of riffles running lengthwise. The platform can be inclined in a single plane or in two planes. In operation, the inorganic particles are places on the high point of the platform and the platform is vibrated in two directions. In one direction the vibrator has high acceleration and in the other direction, a lower acceleration.

Air is blown through the perforations of the air table by a blower (not shown) which gives the inorganic particles a slight lift. The lighter material which is about 40% or more glass, generally jumps the riffles and falls off the side table opposite the heavier material, which follows the riffles along the length of the table and falls off into a reject bin. This reject may be used for landfill.

The glass from air table 20 is conveyed to a froth-flotation unit 21, preferably after slurrying with water. As shown, the glass recovered from the air table may be admixed with the small particle fraction from the trommel screen 16 prior to treatment in the froth-flotation unit 21. Methods for froth-flotation of glass collected from a municipal solid waste treating process are known in the art and they are not described further herein. A suitable method of recovering the glass fraction by froth flotation is disclosed in U.S. Pat. No. 4,077,847, hereby incorporated by reference.

The oversize materials from the screen 18, i.e. the organic particles are conveyed to embrittling reactor 19 by any suitable conveying means. Embrittling reactor 19 may be a rotary drum drier or other means known in the art for providing heat to a finely divided organic material. Means for providing the aldehyde in the gaseous, solid or liquid state, are also associated with said embrittling reactor. Preferably from about 0.1 to about 5% dosage of glyoxal is added as a 10 to 20 weight % aqueous solution. The reaction takes place at a temperature of at least 125° C., preferably from about 150° C. to 175° C. The residence time in the embrittling reactor is generally 20 to 40 minutes. The embrittled material is conveyed from reactor 19 to comminutuion apparatus 22 which may be, for example, a ball mill, an attrition mill, a hammer mill, etc. Of course, the embrittling and comminution can take place in a single unit as will be appreciated by those skilled in the art.

The embrittled material is comminuted until at least 25 weight % of the embrittled material has a particle size of less than 10 mesh. The comminuted material is conveyed to a screen 23 wherein the oversized particles are removed and sent back through the embrittling reactor. Particles which pass through the screen are recovered as a powdered fuel.

I claim:

1. A method of converting the solid organic fraction of waste into a powdered fuel which comprises heating said solid organic fraction in the presence of an aldehyde having more than one carbon atom for a time and at a temperature sufficient to embrittle said solid organic fraction, comminuting said embrittled solid organic fraction to a powder and recovering said powder.

2. The method of claim 1 wherein said aldehyde is a $C_2$ to $C_5$ aldehyde.

3. The method of claim 2 wherein said aldehyde is a multifunctional aldehyde.

4. The method of claim 2 wherein said aldehyde is selected from the group consisting of propionaldehyde, acetaldehyde and glyoxal.

5. The method of claim 2 wherein said aldehyde is glyoxal.

6. The method of claim 1 wherein the aldehyde is present in a dosage of from 0.1% to 10% weight.

7. The method of claim 1 wherein the embrittlement takes place at a temperature of at least 125° C.

8. The method of claim 1 wherein a substantial fraction of said embrittled solid organic fraction is comminuted to a particle size of less than 10 mesh.

9. The method of claim 8 wherein said fraction having a particle size of less than 10 mesh is recovered by screening said comminuted, embrittled solid organic fraction.

10. The method of claim 1 wherein said embrittlement is carried out under an atmosphere incapable of allowing substantial combustion of the solid organic fraction.

11. The method of claim 1 wherein said solid organic fraction is separated from the waste prior to embrittling.

12. The method of claim 1 wherein said embrittlement is carried out at conditions whereby the loss of heating value in the conversion of said solid organic fraction into powdered fuel is less than 10%.

13. The method of claim 1 wherein the embrittlement takes place at a temperature of from about 150° C. to about 250° C.

14. A method for separating municipal solid waste (MSW), comprising an inorganic fraction; including glass, ferrous metals and aluminum; and a solid organic fraction, into valuable materials which comprises:

(a) shredding the MSW to provide a comminuted MSW;

(b) separating a ferrous metal fraction from said comminuted MSW and recovering a substantially ferrous metal-free fraction;

(c) separating said substantially ferrous metal-free fraction into an inorganic fraction, which includes glass and aluminum and a solid organic fraction;

(d) comminuting such inorganic fraction to provide an aluminum-rich fraction having a particle size greater than 0.5 inches and a glass rich fraction having a particle size of less than 0.5 inches;

(e) separating such aluminum-rich fraction from said glass-rich fraction;

(f) recovering glass from said glass-rich fraction;

(g) recovering aluminum from said aluminum-rich fraction;

(h) heating said solid organic fraction of step (c) in the presence of an aldehyde having more than one carbon atom for a time and at a temperature sufficient to embrittle such solid organic fraction;

(i) comminuting said embrittled solid organic fraction to a powder; and (j) recovering said powder.

15. The method of claim 14 wherein the aldehyde is present in a dosage of from 0.1% to 10% weight.

16. The method of claim 14 wherein the embrittlement takes place at a temperature of at least 125° C.

17. The method of claim 14 wherein a substantial fraction of said embrittled solid organic fraction is comminuted to a particle size of less than 10 mesh.

18. The method of claim 17 wherein said fraction having a particle size of less than 10 mesh is recovered by screening said comminuted, embrittled solid organic fraction.

19. The method of claim 14 wherein said embrittlement is carried out under an atmosphere incapable of allowing substantial combustion of the solid organic fraction.

20. The method of claim 14 wherein said embrittlement is carried out at conditions whereby the loss of heating value in the conversion of said solid organic fraction into powdered fuel is less than 10%.

21. The method of claim 14 wherein the embrittlement takes place at a temperature of from about 150° C. to about 250° C.

22. The method of claim 14 wherein the aldehyde is a $C_2$ to $C_5$ aldehyde.

23. The method of claim 22 wherein the aldehyde is a multifunctional aldehyde.

24. The method of claim 14 wherein said aldehyde is selected from the group consisting of propionaldehyde, acetaldehyde and glyoxal.

25. The method of claim 24 wherein said aldehyde is glyoxal.

* * * * *

UNITED STATES PATENT AND TRADEMARK OFFICE
CERTIFICATE OF CORRECTION

PATENT NO. : 4,298,349
DATED      : November 3, 1981
INVENTOR(S) : Shlomo M. Gabbay It is certified that error appears in the above-identified patent and that said Letters Patent are hereby corrected as shown below:

Column 2, line 19, "brittling" should be changed to --embrittling--.

Signed and Sealed this

Nineteenth Day of January 1982

[SEAL]

Attest:

GERALD J. MOSSINGHOFF

Attesting Officer

Commissioner of Patents and Trademarks